(No Model.) 9 Sheets—Sheet 1.

F. H. GILBERT.
VOTING MACHINE.

No. 585,326. Patented June 29, 1897.

WITNESSES

INVENTOR
Frank H. Gilbert
By his Attorney (No Model.) 9 Sheets—Sheet 2.

F. H. GILBERT.
VOTING MACHINE.

No. 585,326. Patented June 29, 1897.

WITNESSES
O. B. Baenziger
M. A. Martin

INVENTOR
Frank H. Gilbert
By his Attorney
Newell S. Wright

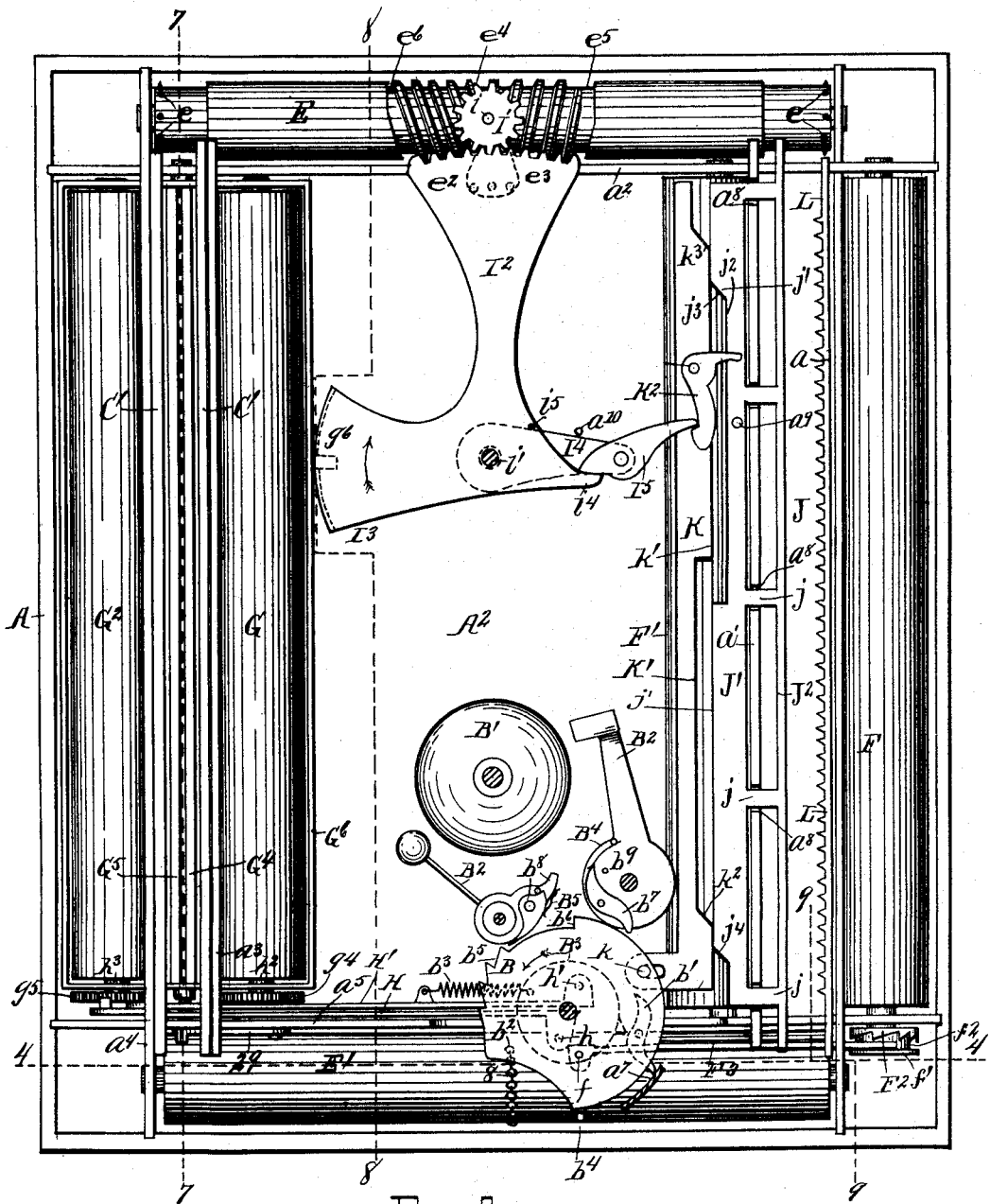

(No Model.)
9 Sheets—Sheet 4.
F. H. GILBERT.
VOTING MACHINE.
No. 585,326.
Patented June 29, 1897.
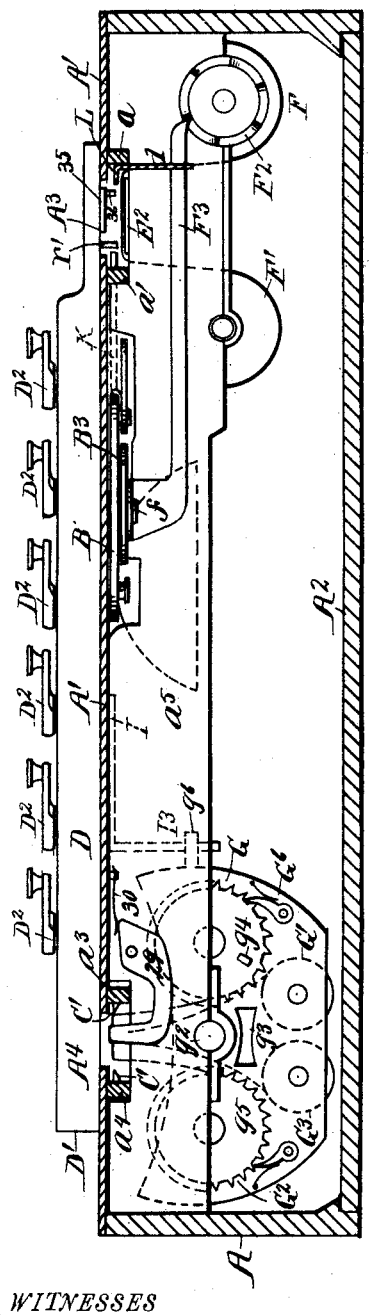
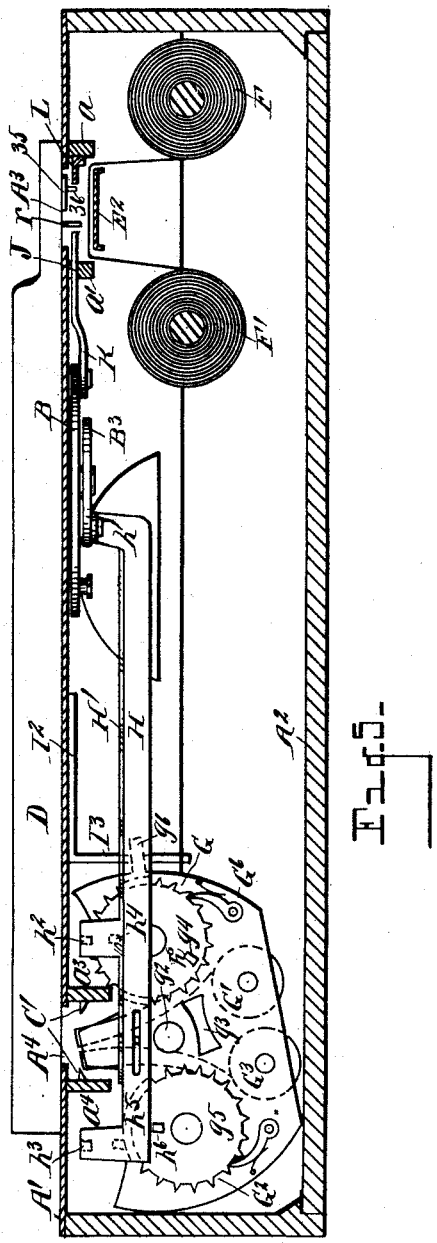
WITNESSES
INVENTOR
Frank H. Gilbert
By his Attorney

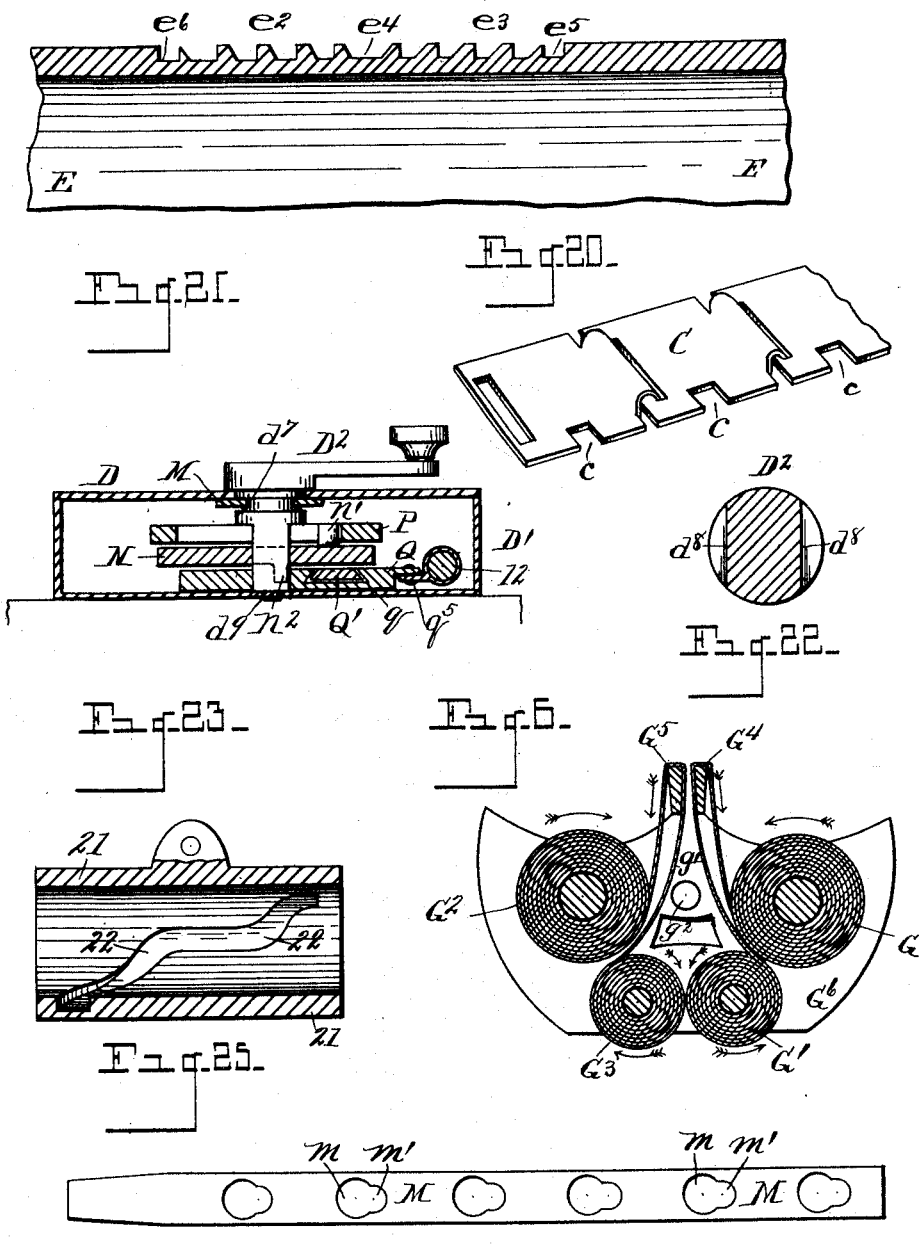

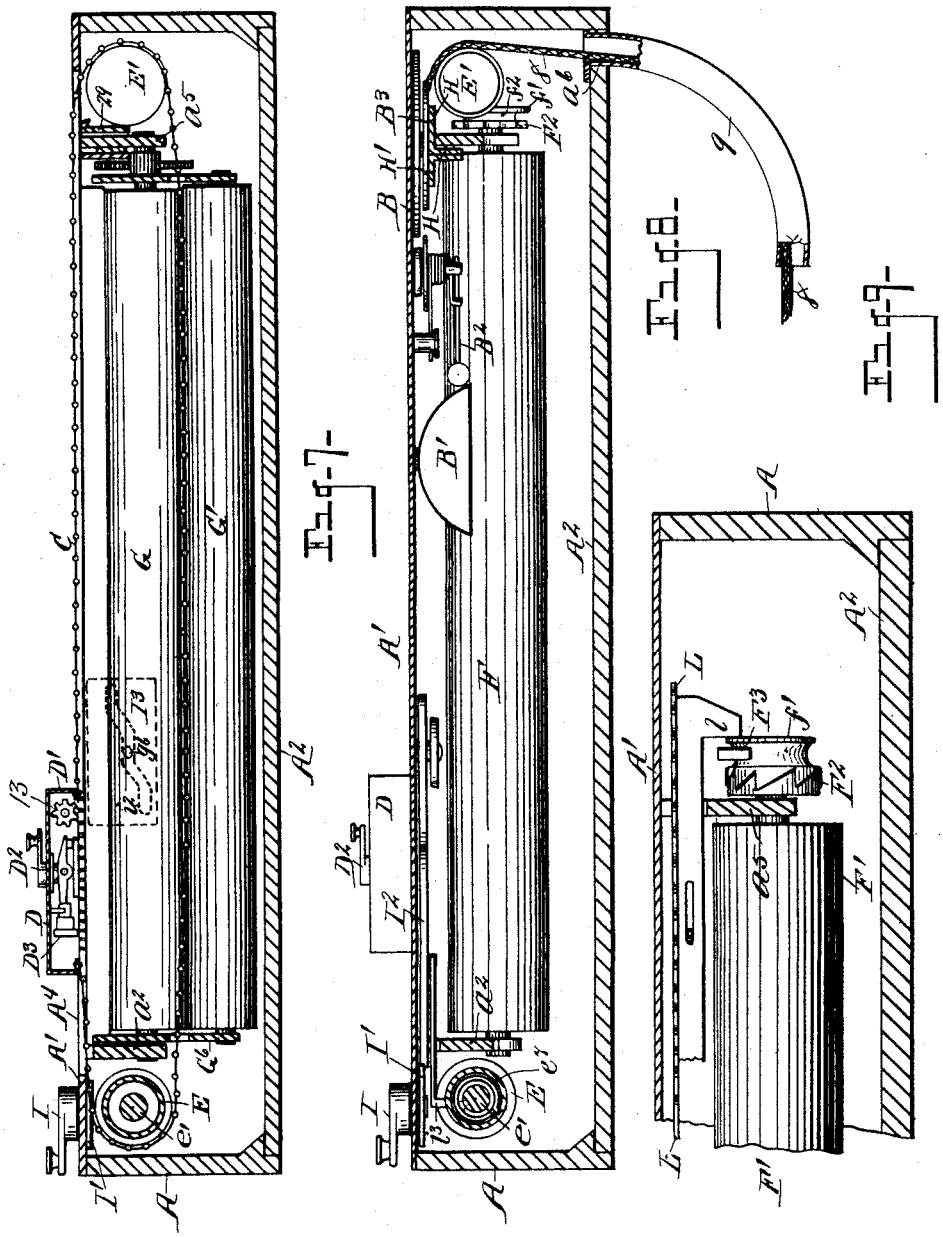

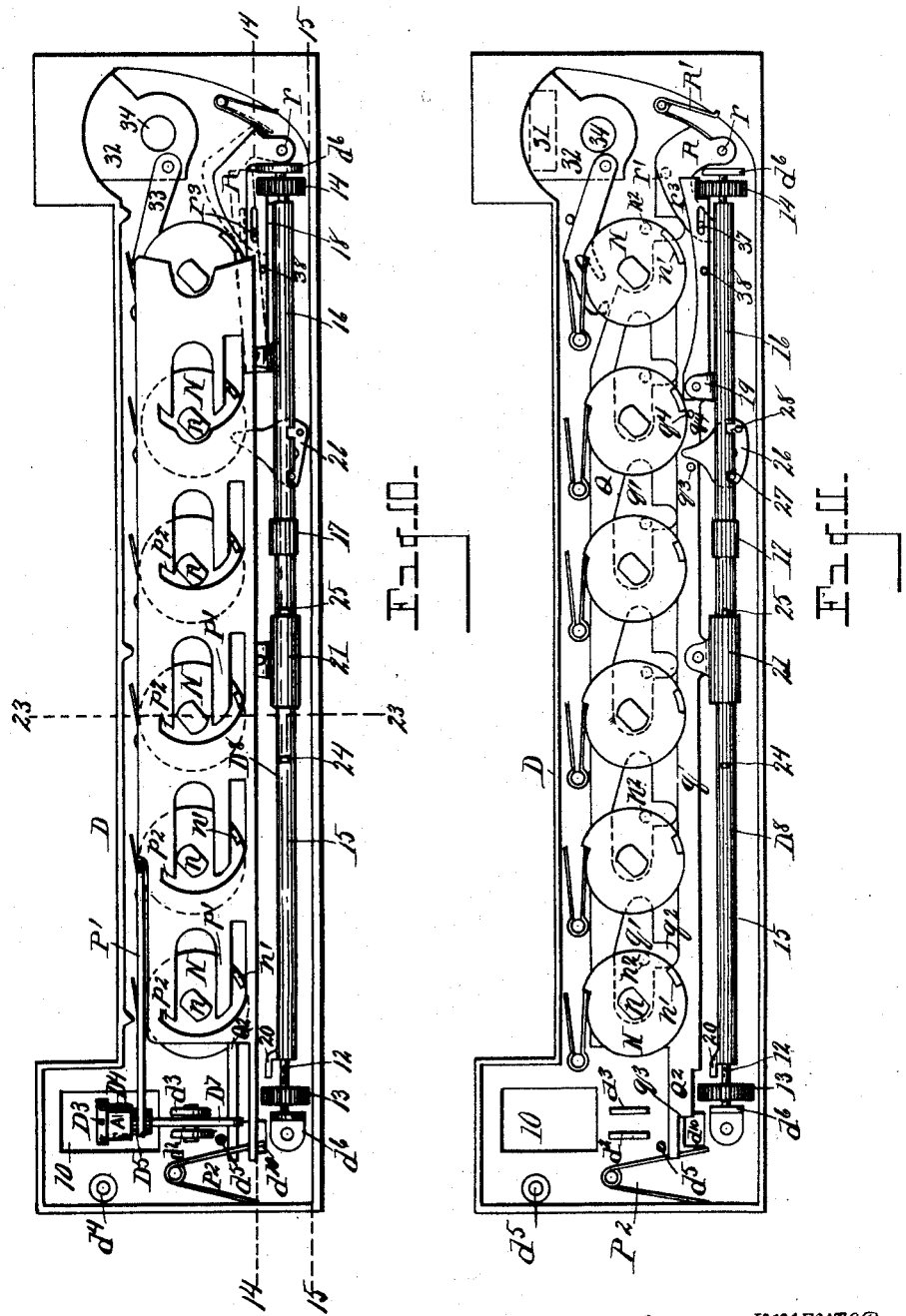

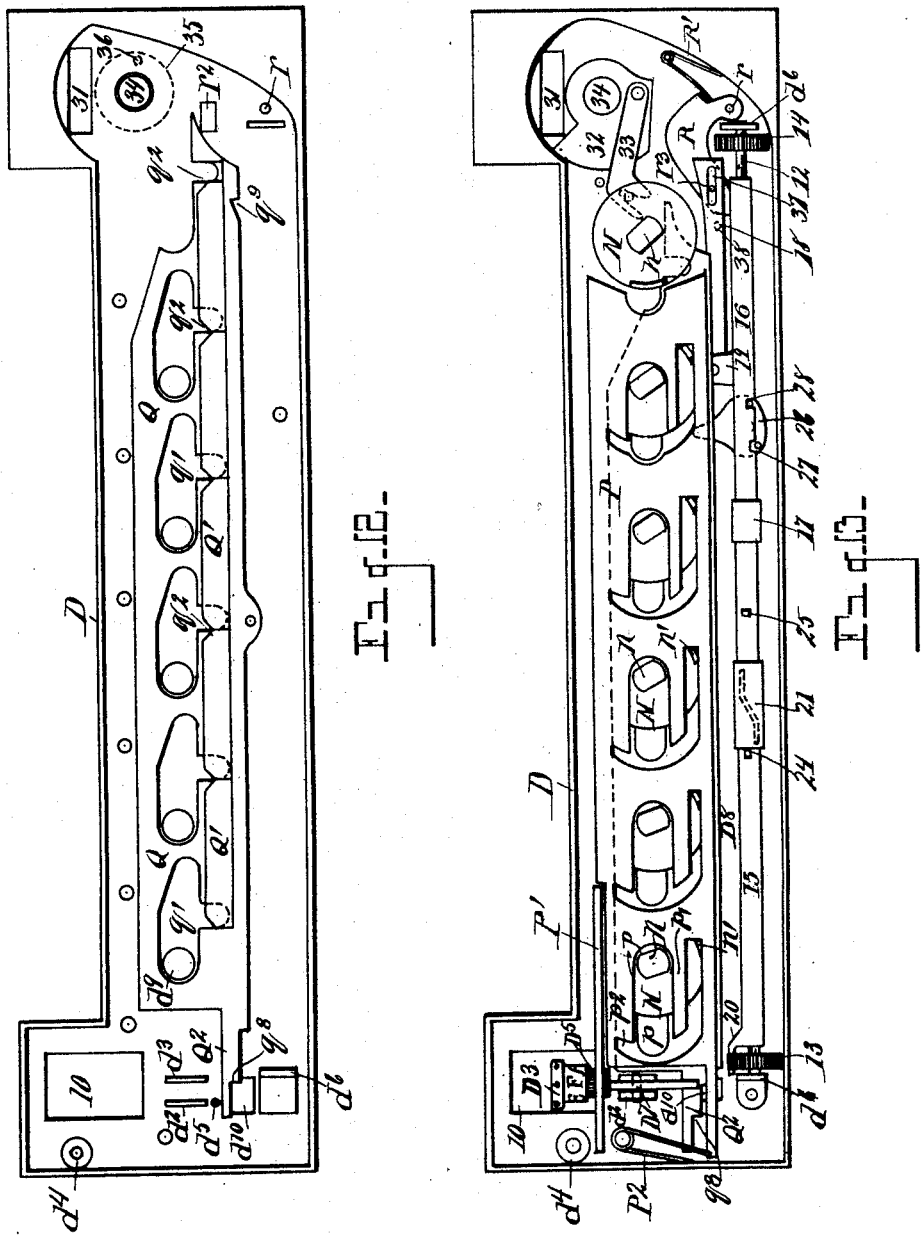

(No Model.)   9 Sheets—Sheet 9.
F. H. GILBERT.
VOTING MACHINE.
No. 585,326.   Patented June 29, 1897.
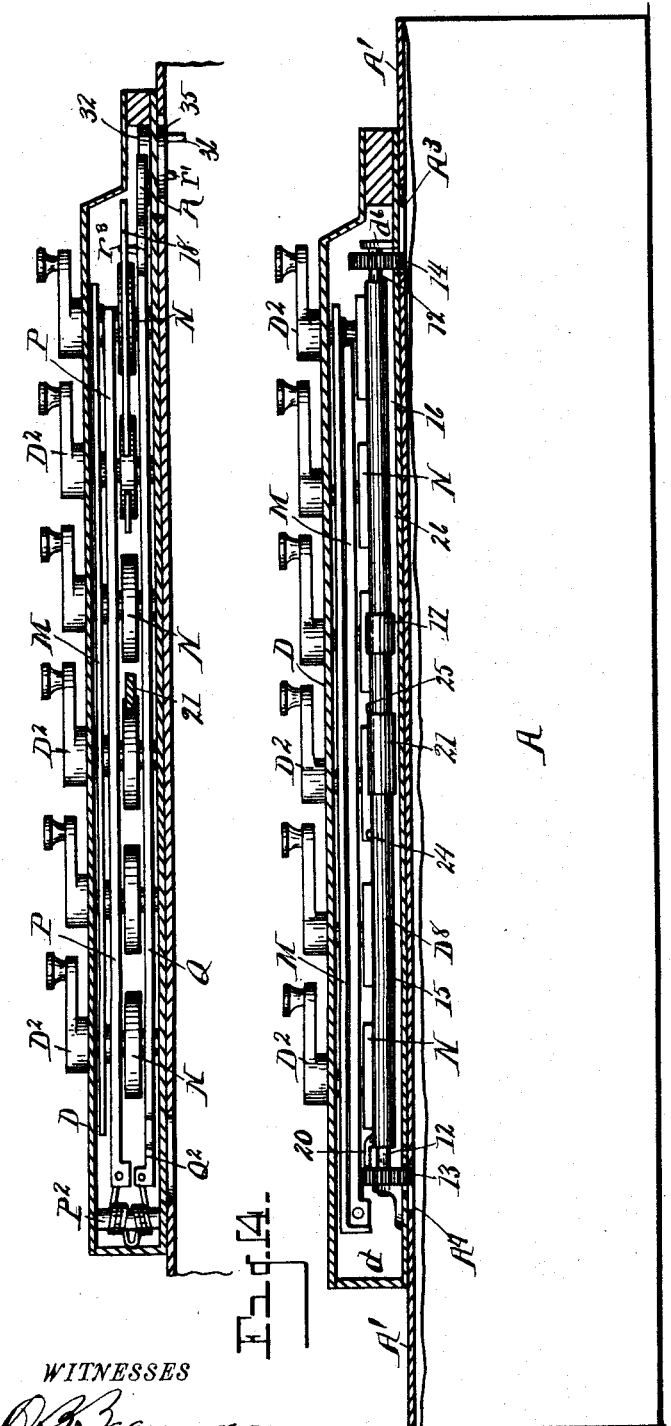
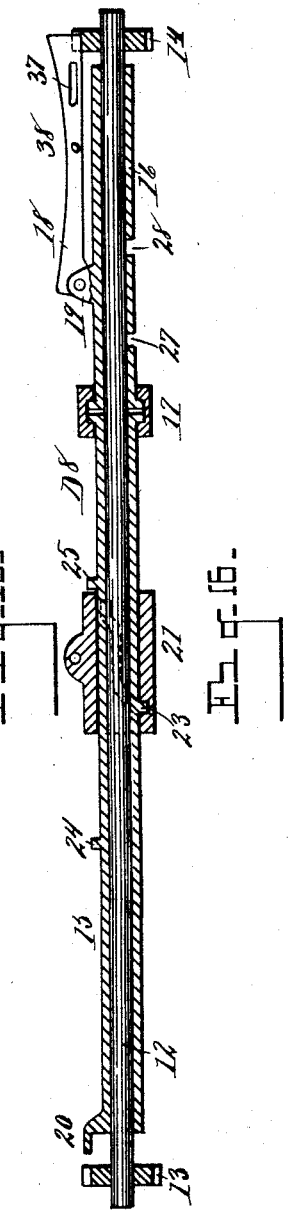
WITNESSES
O. B. Baenziger
M. A. Martin
INVENTOR
Frank H. Gilbert
By his Attorney
Murrell S. Wright

UNITED STATES PATENT OFFICE.

FRANK H. GILBERT, OF RIDGEFIELD, WASHINGTON.

VOTING-MACHINE.

SPECIFICATION forming part of Letters Patent No. 585,326, dated June 29, 1897.

Application filed November 6, 1895. Serial No. 568,086. (No model.)

*To all whom it may concern:*

Be it known that I, FRANK H. GILBERT, a citizen of the United States, residing at Ridgefield, county of Clarke, State of Washington, have invented a certain new and useful Improvement in Voting-Machines; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a voting-machine, and has among its various objects, first, to provide a machine of this class which will record each vote on paper located within a case by means of a suitable stamp or symbol carried by a traveler for each person for whom a vote is cast; second, to secure secrecy; third, to prevent the possibility of repeating; fourth, to permit the voter to see his vote recorded by the machine; fifth, to provide auxiliary mechanism, if desired, to permit a vote to be recorded for any person desired, not named on any of the regular party-tickets; sixth, to construct a voting-machine provided with a movable traveler to pass by successive steps across the "office-rows" upon the case and record each man's vote for a given party on any ticket or a party not nominated, the traveler being returnable to normal position when the voter is through voting; seventh, to provide the traveler with a single set of keys, one for each party and one for a non-nominated party, if desired.

My invention also embodies the general construction, combination, and arrangement of devices and appliances hereinafter described and claimed, and illustrated in the accompanying drawings, in which—

Figure 1:
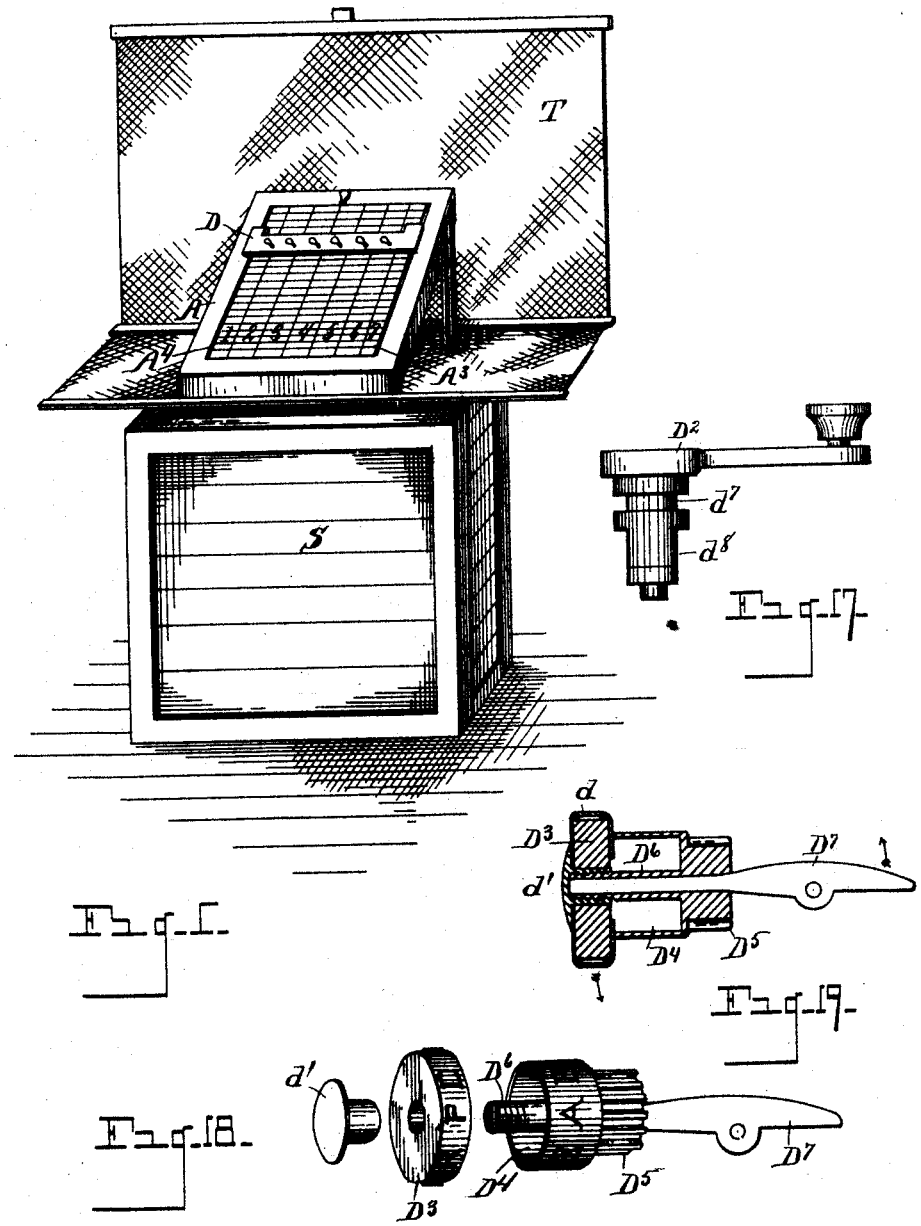
Figure 2:
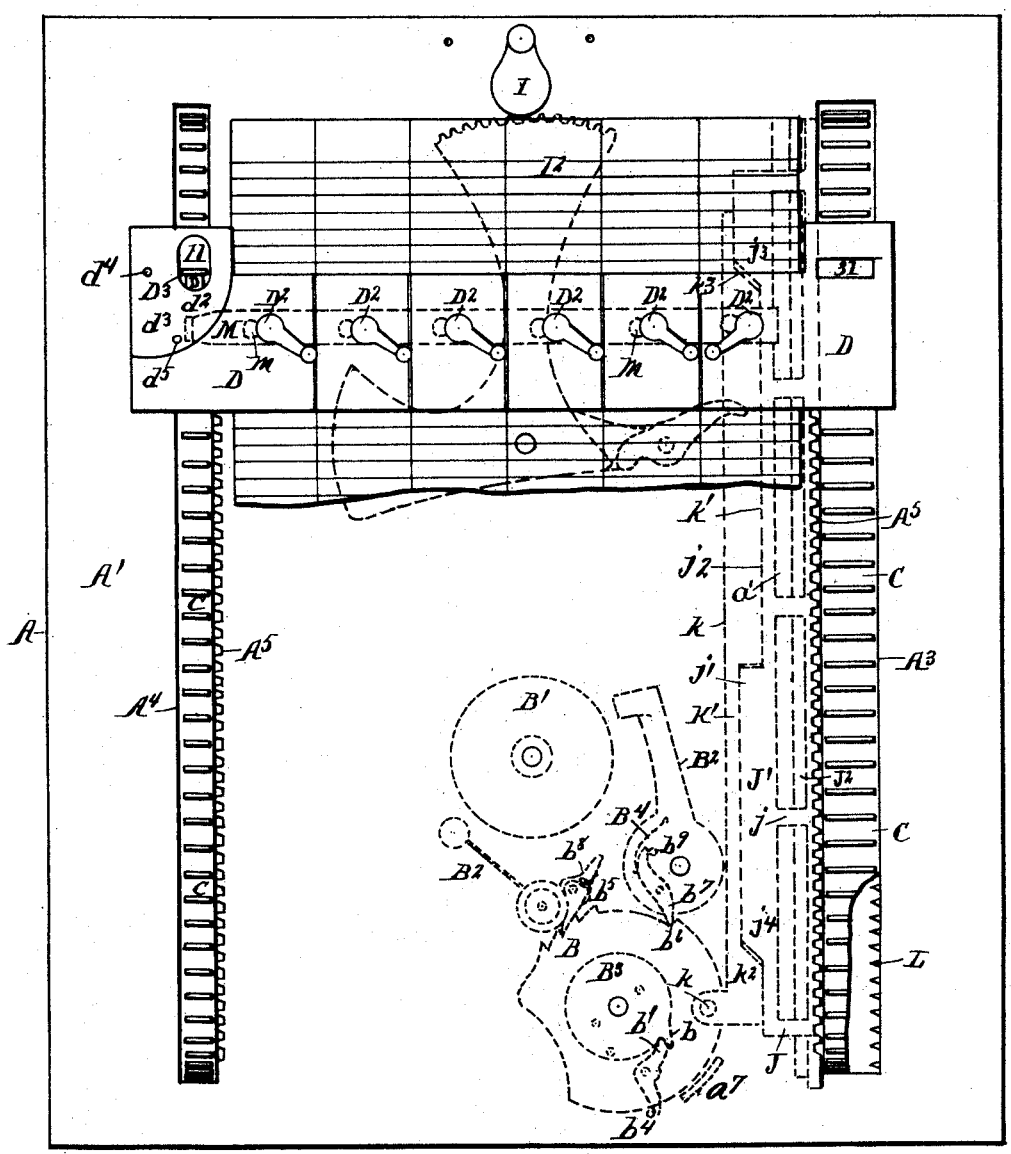

Figure 1 is a view in perspective showing my machine in position for use. Fig. 2 is a plan view of the voting-machine. Fig. 3 is a similar view with the face-plate of the case A, together with the traveler, removed. Fig. 4 is a cross-section on the line 4 4, Fig. 3, the roller E' being omitted. Fig. 5 is a similar section with the brace $a^5$ also removed. Fig. 6 is a detail view in cross-section showing the manner of feeding the paper. Fig. 7 is a view in section on the line 7 7, Fig. 3, showing parts in elevation. Fig. 8 is a view in section on the line 8 8, Fig. 3, showing parts in elevation. Fig. 9 is a detail view on the line 9 9, Fig. 3, showing mechanism to move the paper on which the voter may write a non-nominated vote. Fig. 10 is a view of the traveler with the cover, the lock-slide M, and the keys removed. Fig. 11 is a similar view with the upper slide F, the keys, and the printing mechanism removed. Fig. 12 is a similar view with various parts removed to show the lower slide Q in the base of the traveler. Fig. 13 is a view similar to Fig. 10, showing the parts in operated position. Fig. 14 is a view in section on the line 14 14, Fig. 10. Fig. 15 is a similar view on the line 15 15, Fig. 10. Fig. 16 is a view in longitudinal section of the tubular shafts 15 16 of the mover, showing the axis in elevation. Fig. 17 is a detail view of one of the voting-keys. Fig. 18 shows detail views of the various parts of the printing mechanism, the parts being separated one from another. Fig. 19 is a view in section of the assembled parts of the printing mechanism. Fig. 20 is a detail view showing the construction of the cover-chains. Fig. 21 is a longitudinal section through a portion of the roller E. Fig. 22 is a cross-section of the shank of one of the voting-keys. Fig. 23 is a cross-section of the traveler on the line 23 23, Fig. 10. Fig. 24 is a detail view of the slide M. Fig. 25 is a longitudinal section through the collar 21.

I carry out my invention as follows:

A represents a case, made of any suitable material, provided with a top face-plate A', preferably made of sheet metal, and with a bottom $A^2$, which is wholly or in part removable to give access to the inside of said case. To give firmness to the case and to provide supports for various portions of the mechanism, the case is provided with interior braces or bars $a, a', a^2, a^3, a^4,$ and $a^5$. The face-plate A' is constructed with longitudinally-extended openings $A^3$ $A^4$ therethrough, one on each side of the case and extending parallel one with the other, longitudinally of which the traveler is movable and through which access is had to record the votes, the regular party-vote being recorded through the opening $A^4$ and the non-nominate vote through the opening $A^3$. The inside edges of the face-plate adjacent to said openings are cut to form rack-teeth, as shown at $A^5$, Fig. 2, meshing with pinions carried by the traveler to give movement to the traveler, as hereinafter explained. The lists of candidates nominated by the various parties are to be secured on the upper surface of the face-plate between the openings $A^3 A^4$, the party-lists being indicated by the numerals 1 2 3 4 5 6 7, Fig. 1, the transverse lines indicating the office-rows.

It will be understood that the machine may be constructed and arranged for any desired number of party-tickets and for the record of non-nominated votes for any office and that there may be any desired number of office-rows, the number of votes to be cast by a given voter being limited to one for each office-row.

On the under side of the face-plate $A'$ is axially supported a rotatable disk or wheel B, Figs. 2 and 3, to be operated by a proper officer to set the voting-machine in normal condition ready for voting and to sound an alarm, said wheel being actuated in any suitable manner, as by a chain or cable 8, passed through an opening $a^6$, Fig. 8, in the case A, said opening being preferably threaded to receive a tube 9, through which said operating chain or cable is passed. $B'$ is a gong, and $B^2$ hammers engaged on the under side of said face-plate.

$B^3$ is an auxiliary disk located beneath the disk or wheels B, upon the same axis and actuated thereby, said disk $B^3$ being free to turn upon its axis independently of the wheel B.

C C, Fig. 7, denote movable chains employed to cover the openings $A^3 A^4$, except such portions of said openings as are covered by the traveler (shown at D) hereinafter to be described, as it travels along said openings, and prevent access to the paper beneath said openings upon which the votes are recorded within the case A, said chains being connected with the traveler and made movable along said openings therewith.

$C' C'$, Fig. 3, denote chain-supports at each edge of the openings $A^3 A^4$, which supports may be fastened to the supporting-bars $a^3 a^4$, upon which supports the corresponding chains may slide.

E E' are rollers at opposite ends of the case A over which said chains are passed. These chains are constructed at one edge with notches $c$, as shown in Fig. 20, and the upper roller E with pins $e$ to engage said notches. The upper roller E is a spring-roller, analogous in construction in this respect to an ordinary spring curtain-roller, $e'$ denoting the interior shaft, provided with a coiled spring $e^2$, Fig. 8, which becomes tense as the traveler moves downward upon the case A, and serving to automatically return the traveler to normal position when the voter is through and the traveler is free to return.

To provide for recording a non-nominated vote, the machine is supplied with two paper-rollers F F', Fig. 5, arranged on either side of the opening $A^3$ beneath the base-plate, one of said rollers being a supply-roller and the other a storage-roller.

$E^2$ denotes a paper-support located above and between the rollers F F' and below the opening $A^3$, the paper being carried from the holding-roller up and over said support, as near to the surface of the machine as possible. This support is preferably made of sheet metal, having a flat upper surface extending between and parallel with the bars $a$ and $a'$ beneath the bars $a^2 a^3$ of the case A, affording a flat surface under the paper for writing thereupon the name of a non-nominated party when the opening $A^3$ is uncovered at the desired point.

To record the votes for the party-nominees, I prefer to employ on the opposite side of the case A two sets of paper-rollers, G and G' denoting one set and $G^2$ and $G^3$ the other set, there being two rollers to each set, said rollers arranged so that the paper $g$ and $g'$ on either of said sets of rollers may be brought into position to record a vote thereupon, as may be desired.

$G^4 G^5$, Fig. 6, represents two paper-supporting parallel bars located below the opening $A^4$, each preferably having a flat upper surface and constructed to allow the paper from the corresponding set of paper-rollers to be fed thereover freely and smoothly. The two sets of paper-rollers G G', $G^2 G^3$, together with the bars $G^4 G^5$, are supported in an oscillatory casing $G^6$, journaled at its extremities in the braces $a^2 a^5$, as indicated at $g^2$, to bring either of said bars $G^4$ or $G^5$ into proper position for recording a vote. This oscillatory casing, with the parts supported therein, is made detachable from the case A. The bars $G^4 G^5$ may be rigidly connected with the casing $G^6$, while the two sets of rollers G G', $G^2 G^3$ are journaled in said case.

It will be seen, especially by reference to Fig. 6, that the paper passes from the roller G up over the bar $G^4$ and downward and about the receiving-roller G', while the paper from the roller $G^2$ passes up over the bar $G^5$ and downward about the receiving-roller $G^3$. The journals $g^2$ of the casing $G^6$ are located directly below the middle line of the opening $A^4$, permitting the casing $G^6$ to turn on said journals sufficiently to bring either of the bars $G^4 G^5$ directly under said middle line of said opening. Each end of the casing $G^6$ is provided with an orifice $g^3$ for the passage of the corresponding chain C. To actuate the rollers G and $G^2$, they are provided with ratchet-wheels $g^4 g^5$, located outside the casing $G^6$. To operate these ratchet-wheels, pawls H and H' are provided, eccentrically connected with the disk $B^3$, as indicated at $h$ and $h'$, Fig. 3, the said pawls being provided with pins $h^2$ and $h^3$, respectively, engaging the teeth of said ratchet-wheels. The pawls H H' are connected with the disk $B^3$ on opposite sides of the center thereof, so that said pawls shall operate in opposite directions, each on its own ratchet-wheel, so that the rollers G and $G^2$ will be actuated in opposite directions, as required. The teeth on these ratchet-wheels may be spaced in any suitable manner.

To oscillate the casing $G^6$, I provide a crank I on the outside of the case A upon the top of the face-plate $A'$, Figs. 2, 7, and 8, said crank being rotatable in either direction from its normal position a suitable distance to bring the paper on one of said sets of rolls into position for receiving the record of a vote. The shank $i$ of said crank passes through the face-plate and is provided at its inner end with a pinion $I'$, with which meshes a bell-crank lever $I^2$, fulcrumed on the under side of the face-plate $A'$, as indicated at $i'$, the said bell-crank lever being toothed upon one edge to mesh with the pinion $I'$. The opposite extremity of said bell-crank lever is provided with an inwardly-turned flange $I^3$, Fig. 7, provided with a cam-slot $i^2$, engaged by a pin $g^6$ upon the casing $G^6$, whereby the said casing is oscillated as the bell-crank is operated by the movement of the crank I in either direction by the voter.

By the use of the two rolls of paper on which to cast the party-votes and leaving it entirely optional with the voter in which direction he may turn the crank I to oscillate the casing $G^6$ to throw either of said rolls of paper into position to receive the record of his vote it will be apparent that the entire vote of any given voter will be recorded in a column on the paper-roll which is thus in position to receive his vote and that paper-roll will be acted upon through the medium of the corresponding ratchet-wheel $g^4$ $g^5$, as the case may be.

While it is optional with the voter as to which roll he will record his vote upon, having once moved a given roll into position to receive his vote he cannot, as will be hereinafter explained, remove it and use the other roll. By this mechanism a part of the votes cast by the entire number of voters will be on one paper-roll and the rest of the votes will be recorded on the other paper-roll. By this arrangement it will be impossible to detect whether a bribed voter has voted as he bargained, as might possibly be the case were a single paper-roller employed, in which latter case a vote-buyer, by getting hold of the record and knowing the order in which a bribed voter has voted, could count along the record and see if the party has voted as he agreed. By recording the votes on two rolls of paper, as above, it will be impossible to make any such detection.

To hold the bell-crank lever $I^2$ in place and prevent its returning to normal position and any changing of the paper-rolls before the voter has completed his record, the roller E, intermediate its ends, is constructed with right and left hand screw-threads, as indicated at $e^2$ and $e^3$, Figs. 3 and 21, both running into an intermediate annular groove $e^4$ and terminating in the opposite direction in similar grooves $e^5$ $e^6$, respectively. I provide also a spring-catch $i^3$, Fig. 8, engaged with said lever $I^2$, its free end engaging in the grooves of the threaded portion of the roller E. These grooves, as will be seen by reference to Fig. 21, are beveled on their outer edges, so that said catch $i^3$ can readily pass away from the middle groove $e^4$. Said catch, however, is prevented from returning by the straight edge of said grooves (shown in said figure) until the motion of the roller E is reversed, as hereinafter described, at the completion of the recording of a given voter's votes. It will be obvious that but one of the ratchet-wheels $g^4$ $g^5$ is to be operated by a given movement of the disk $B^3$. Accordingly the pawls H and $H'$ are so arranged that only one of them is in operative position when the case $G^6$ is oscillated in either direction.

In the position shown in Fig. 5 the pin $h^2$, it will be seen, is engaged with the ratchet-wheel $g^4$, while the pin $h^3$ is out of engagement with the ratchet-wheel $g^5$. When the casing $G^6$ is oscillated in the opposite direction from that shown in Fig. 5, obviously the ratchet-wheel $g^5$ will be lifted into engagement with the pin $h^3$ and the ratchet-wheel $g^4$ will be rolled away from engagement with the pin $h^2$. When the machine is in normal position, both pins $h^2$ $h^3$ will be out of engagement with the corresponding ratchet-wheel.

The paper-roller F is also provided with a ratchet-wheel $F^2$, operated by a rod or pawl $F^3$, eccentrically connected with the disk $B^3$, as indicated at $f$. This ratchet-wheel $F^2$ is preferably constructed with the teeth cut on the side thereof, as shown, and the pawl $F^3$ is made free to move or spring sidewise as well as to move upward and downward, so as to be thrown sidewise every time it acts upon said ratchet-wheel $F^2$. Said ratchet-wheel is provided with a hub $f'$, grooved as at $f^2$, the pawl $F^3$ riding in said groove and working back and forth therewithin, not acting on the teeth of the adjacent ratchet-wheel until forced into engagement therewith.

The wheel B and the disk $B^3$ are shown in normal position in Fig. 2 and in operated position in Fig. 3.

To operate the disk $B^3$, it is provided with a suitable lug $b$, and $b'$ is a pawl fulcrumed upon the wheel B, arranged to actuate the disk $B^3$ when the wheel B is operated by the cable 8, said pawl engaging against said notch. The chain 8 is eccentrically connected with the wheel B, as shown at $b^2$, and when force is applied thereto, as by an officer of the election, it is evident that the wheel B will be thrown over in the direction of the arrow, Fig. 3, the pawl $b'$ rising in contact with said notch $b$, the pawl passing from the position shown in Fig. 2 to that shown in Fig. 3.

Upon the face-plate $A'$ is engaged a bracket $a^7$, Fig. 3, so arranged that soon after the starting of the pawl $b'$ said pawl will strike said bracket and be released thereby from the notch $b$, permitting the independent retraction of the disk B³ by a retracting-spring b³, which may be connected with the pawl H′ and said disk. On the return of the wheel B to its normal position the pawl b′ strikes a stud b⁴ on the face-plate, which forces the pawl again into engagement with the notch b in readiness for another operation.

The operating cable or chain 8 may be operated in any desired manner within the scope of my invention, as by an officer of the election controlling the same or otherwise. By these means the officer in charge, by pulling upon the chain or cable 8 after any voter has voted, will cause that ratchet-wheel controlling the paper-roll that has just been voted upon—g⁴ or g⁵, as the case may be—to be thrown over to properly advance the paper into position to receive the following vote before the voter operating the crank I oscillates the case G⁶ to bring one of the paper-rolls into position to receive the record of his vote.

The pawls H and H′ are each provided with two pins, the pins h² and h³, Figs. 3 and 5, actuating the adjacent ratchet-wheels, as above explained. Other pins h⁴ and h⁵, Fig. 5, are employed, connected with said pawls, respectively, to actuate the corresponding ratchet-wheel one every complete revolution thereof, said ratchet-wheels g⁴ and g⁵ being provided with a pin h⁶ on the side of the wheel toward the center, the engagement of the pins h⁴ and h⁵ with the pins h⁶ serving to force the corresponding roller farther about once at each revolution. This causes the paper to be printed or stamped in a number of close columns and then a space therebetween. The pawls H and H′ are so arranged as not to return to normal position until the respective ratchet-wheels actuated thereby are moved out of contact therewith.

The gong B′ is sounded by the hammers B², as shown in Figs. 2 and 3, in the following manner: The wheel B is toothed on a portion of its periphery, as indicated at b⁵, and provided with a shoulder b⁶. The hammers are provided with pawls b⁷ b⁸, respectively, fulcrumed thereupon, as shown. Adjacent to the outer end of the pawl b⁷ the corresponding hammer is provided with a pin b⁹, the other end of said pawl b⁷ normally engaging the shoulder b⁶ of the wheel B. It will be evident that as said wheel is rotated in the direction of the arrow the pawl engaging the pin b⁹ will cause the corresponding hammer to be withdrawn from the gong, and that when the wheel B has rotated far enough to release the pawl the hammer will strike the gong, said hammer being provided with a retracting-spring B⁴. The pawl b⁸ is arranged to engage the toothed portion of the wheel B as it revolves, causing a succession of blows upon the gong, a spring B⁵ being provided to hold the pawl in place. The gong will thus be struck one blow by the right-hand hammer when the wheel B is turned in one direction, and when said wheel returns the opposite hammer will strike a succession of blows upon the gong.

J denotes a slide arranged to free the traveler from the moving mechanism and to permit the return of the traveler D, when the voter is through, to its normal position on the case A in the manner hereinafter stated. The slide is shown in operated position in Fig. 3 and in normal position in dotted lines, Fig. 2. This slide is formed with parallel bars J′ J², connected by suitable cross-arms j, the cross-arms resting in corresponding recesses at a⁸ in the underlying brace a′. The slide J holds the position indicated in Fig. 2 while the voter is voting, and when he is through it is made to take the position shown in Fig. 3. To actuate said slide, I provide a bar K, eccentrically connected with the wheel B, as shown at k. This bar is formed with a recessed portion K′ to normally receive a corresponding projection j′ upon the slide J. The bar J′ of the slide is formed with a recess j² to normally receive a corresponding projection k′ on the bar K, the bar being formed with beveled edges at k² and k³, while the slide is formed with corresponding beveled edges j³ j⁴. The bar K is provided with a latch K², pivoted thereto, as shown in Figs. 2 and 3, and the face-plate A′ with a tripping-pin a⁹. Upon the bell-crank lever I² is pivotally connected a lever-arm I⁴, provided with a catch I⁵, pivoted to the outer end thereof, which catch I⁵ is engageable at its outer end with the shoulder i⁴ upon the lever I² to engage the adjacent end of the catch I⁵. Upon the lever I² is a pin i⁵, engageable with the edge of the arm I⁴. Upon the face-plate is a pin a¹⁰, engageable with the edge of the arm I⁴.

The bar K is moved into the operated position shown in Fig. 3 by the officer in charge pulling the cable 8, this turning the wheel B and forcing said bar into said position, enabling the traveler to be returned to normal position. When the bar K is moved into operated position, as shown in Fig. 3, the slide J is moved to the right by reason of the beveled faces k² k³ j³ j⁴. The bar K is returned to its normal position by the voter turning the crank I, preventing the retraction of the traveler while voting, the crank I operating the bell-crank lever I², said lever acting upon said bar through the arm I⁴, the catch I⁵, and the latch K² whichever direction may be given by the lever I² by the voter. Thus if the lever I² be moved in the direction of the arrow, Fig. 3, the pin i⁵, engaging the arm I⁴, will carry the catch I⁵ with it just as if the parts I⁴ I⁵ were rigidly connected with said bell-crank lever. When said lever is moved in the opposite direction, then the arm I⁴ is held from turning on its fulcrum by the pin a¹⁰, the shoulder i⁴ of said lever engaging the adjacent end of the catch I⁵, thereby forcing the opposite end of the catch downward. The latch K² is so arranged that it will strike the tripping-pin a⁹ in the downward movement of the rod K, thereby releasing the latch from the catch I$^5$ in readiness for the return of said rod by the officer in charge in the manner above described, while the position of the lever I$^2$ will remain until acted upon by the return of the traveler in the manner hereinafter set forth.

L is a toothed slide extending the whole length of the opening A$^3$ in the face-plate A', said slide provided with an arm $l$, Figs. 4 and 9, and having its teeth corresponding in number and in distance according to the office-rows, so that no matter what may be the position of the traveler D said slide may be actuated, as will be subsequently explained, and moved forward, engaging the arm $l$ with the pawl F$^3$ to force said pawl into engagement with the adjacent ratchet-wheel F$^2$, as already explained.

I will next explain the construction and operation of the traveler D, (shown in normal position in Figs. 1, 2, 4, 5, and 7,) said traveler being movable up and down along the length of the openings A$^3$ A$^4$ and moving the chains C, which are connected therewith. This traveler is constructed with a case D', provided with a number of voting-keys D$^2$, one for each party-ticket and one for non-nominate voting. The case is preferably made of sheet metal, the bottom and sides of which may be made in a single piece, while the top consists of a flat cover fitted to the case and fastened thereto in any suitable manner.

The mechanism of the traveler is adapted to accomplish four results—viz., the printing or stamping of the record of the vote to be recorded upon the paper-roll within the case A, the movement of the traveler downward along the slots A$^3$ A$^4$ of the case A to the next office-row, to uncover the opening in the slot A$^3$ for writing the name of a non-nominated party, if desired, and to disengage the proper connections to permit the return of the traveler to its normal position at the top of the openings A$^3$ A$^4$.

The printing or stamping mechanism carried by the traveler is arranged to mark as many records as there are voting-keys D$^2$—i. e., one for each party nominated—downward along any desired number of rows. This printing mechanism, as shown in the drawings, consists, essentially, of a type-wheel D$^3$, Figs. 18 and 19 particularly, bearing upon its periphery at suitable intervals any desired symbols or characters to properly record the votes cast. This type-wheel is covered with ribbon or cloth, as indicated at $d$ in Fig. 19, of good capillarity, its edges being folded down over the sides of the wheel, as shown. The ink is contained in a suitable reservoir D$^4$, to which is attached a pinion D$^5$, the ink being carried to the type-wheel by capillary attraction in the cloth $d$.

B$^6$ is the axis of the pinion, made tubular and extended beyond the reservoir, as indicated, and threaded to receive a nut $d'$. The type-wheel, reservoir, and pinion are mounted upon a lever D$^7$, fulcrumed intermediate its ends in ears $d^2$ $d^3$, Figs. 10 and 11, projecting upward from the bottom of the case D'. One end of this lever projects into the tubular axis D$^6$, said axis rotating thereupon, the adjacent end of the lever being headed down to hold the parts in place. To unite the parts of the printing mechanism, the reservoir is held in a perpendicular position, filled with ink. Then the type-wheel, with its cloth edge well turned in, is fastened upon the axis D$^6$ by means of the nut $d'$. The outside of the reservoir is provided with symbols or characters similar to those on the type-wheel, except that they are so placed thereupon as to be directly opposite the similar symbols or characters upon the type-wheels. These symbols may consist of any character readily distinguishable by the voter, the same symbols heading the various party-columns appearing on the voting-keys D$^2$. The type-wheel in the act of printing is thrown downward to record the vote upon the paper roll therebeneath through an opening 10, Fig. 12, in the bottom of the case D', and through the opening A$^4$, Fig. 4. In order that the voter may see his work, another opening 11, Fig. 2, is provided in the top of the case of the traveler immediately over the opening 10, the type-wheel lying between said openings. Then as the voter moves the voting-key the corresponding symbol will appear on the upper side of the reservoir as that recorded upon the paper roll, and when the traveler has moved downward one space the voter will be able to see that his vote has been properly recorded on the paper. This opening 11 is covered with glass in a lid $d^3$ and pivoted, as at $d^4$, to the case D', and having a screw-fastening $d^5$, reached from the inside of the case A, so that the lid can readily be swung around to disclose the printing mechanism, allowing it to be taken out and the reservoir to be refilled.

Within the case D' of the traveler is a mover D$^8$ to move the traveler along the case A downward along the slots A$^3$ A$^4$. Said mover is provided with an axis 12, Fig. 11, journaled at its extremities in brackets or ears $d^6$, said axis carrying at its extremities two pinions 13 and 14, rigidly engaged therewith, said pinions gearing into the racks A$^5$, already described, of the face-plate A' and adapted to give movement to the traveler in the operation of the machine. Sleeved upon this axis 12 are two tubular shafts 15 and 16, connected at their adjacent ends by a coupler 17. These shafts or sleeves 15 and 16 are so arranged that the sleeve 15 is permitted to rotate a short distance upon the axis, while the sleeve 16 remains unmoved.

18 is a stop or pawl jointedly connected to the shaft 16, Figs. 13 and 16, as to an ear 19, while the sleeve 15 has rigidly engaged therewith a stop or pawl 20. Upon the shaft or sleeve 15 is mounted a collar 21, arranged to slide longitudinally of the sleeve, but being non-rotatable. This collar is provided internally with a helical groove, as indicated at 22 in dotted lines, Fig. 16, and in full lines in Fig. 25. Into this groove projects a pin 23 upon the sleeve 15. The sleeve 15 is also provided with stops 24 and 25 to limit the longitudinal movement of the collar thereupon.

It will be found that when the collar has been advanced, in the manner hereinafter explained, toward the stop 24 it will strike said stop and the force exerted upon the collar will then carry the sleeve 15 longitudinally forward on the axis 12, forcing the stop 20 between two of the teeth of the pinion 13 to hold said pinion from rotation. The shaft or sleeve 15 is held in its advanced position by a pawl 26, Fig. 13, fulcrumed on the base of the traveler, said pawl engaging in an orifice 27 in the sleeve 16. The movement of the collar 21 in the opposite direction causes the sleeve 15 first to rotate in the direction opposite that just before described, but without moving said sleeve longitudinally of the axis 12 at first, and thereby to rotate the pinion 13, as the stop 20 is still in engagement therewith. This rotation of the sleeve 15 and the pinion 13 will continue until the collar strikes the stop 25, when the sleeve 15 will be moved longitudinally upon the axis, removing the stop 20 from the pinion 13, and at the same time the sleeve 16 will be forced in the corresponding direction toward the pinion 14, forcing the stop or pawl 18 into engagement with the pinion 14, where it will be held by the pawl 26 engaging in an orifice 28 in the sleeve 16. By this means the pinion 14 is held from rotation until the stop 20 is forced again into engagement with the pinion 13, as hereinbefore described, by the return of the collar 21 toward the pinion 13, rotating the pinion 13 again until by the retraction of the collar 21 the stop 18 can reëngage the pinion 14. By this means it will be observed one of the stops 18 or 20 is in engagement with the corresponding pinion, the movement of the pinion 13 serving as a spacer in the movement of the traveler.

The voting-keys $D^2$ are each constructed with a shank (shown more fully in Fig. 17) passing downward through the case of the traveler and held in place by a slide M therewithin (shown in dotted lines, Fig. 2) engaging a groove $d^7$ in said shank, the slide holding all the voting-keys simultaneously in this manner. This slide M, also shown in Fig. 24, is located beneath the cover of the traveler and consists of a flat bar provided with openings $m$, through which the shanks of the voting-keys may pass. Said openings, formed with a recess at one side, are shaped, as at $m'$, to engage the grooves $d^7$ when the bar is pushed by hand into said grooves. The slide when in such position is held from disengagement by dropping behind the adjacent ear $d^2$.

The traveler is provided with a series of wheels or disks N to actuate certain portions of the mechanism within the traveler in which the shanks of the voting-keys are engaged, said shanks being preferably cut away in opposite sides, as shown, making this portion of the shank elongated in cross-section, as shown at $d^8$, Figs. 17 and 22, to engage the correspondingly-shaped orifices $n$ in said wheels, the movement of the voting-key giving a corresponding rotation to the corresponding wheel.

To actuate the printing mechanism, I employ a slide P, Fig. 13, resting upon the wheels or disks N and having a reciprocatory movement, said slide being formed with openings $p$ to engage the shanks of the voting-keys and whereby the slide is held in place. These openings in the slide P, as shown, have a main elongated portion in which the shank of the corresponding voting-key travels, together with an elongated parallel slot communicating therewith, at one end thereof, to receive a spur $n'$ on the upper surface of the corresponding disk N, the slide P having a tongue $p'$ between the main portion of the orifice $p$ and the parallel slot opening therein, as shown. The orifice $p$ is also formed with a recess $p^2$ to engage and lock the spur $n'$, the orifice $p$ being formed on the arc of a circle from said recess into the parallel portion of the slot in which the spur $n'$ is normally engaged.

Fig. 10 shows the normal position of the disks N and slide P, none of the voting-keys $D^2$ having been operated. Fig. 13 shows said disks and slide in the position assumed when operated by the right-hand voting-key. It will be evident, since the center of each of the disks N is the center of its motion, that the spur $n'$ on the turning of the corresponding voting-key will bear against the arc-shaped edge of the corresponding slot $p$ and force the slide P forward. The disks N being immovable longitudinally of said slide, this movement of the slide will take place until the spur $n'$ is locked in the shoulder $p^2$.

It will be observed by reference to the drawings, especially Figs. 10 and 13, that the arc-shaped edges of the orifices $p$ in the slide against which the spur $n'$ presses is at different distances from the centers of the various wheels or disks N, whereby a different length of movement is given by each voting-key to the slide P. The right-hand voting-key is arranged to give the greatest length of movement to said slide. With the slide P is engaged a rack-bar P' in mesh with the pinion $D^5$ of the printing mechanism, said rack-bar being reciprocated by the movement of said slide. It will be evident that if the same length of movement were given to the rack-bar by the movement of each of the voting-keys the type-wheel $D^3$ would always strike the same character or symbol upon the paper thereeneath; but by giving the said rack-bar different lengths of movement by the various voting-keys the type-wheel is readily rotatable to strike any given character or symbol desired. The slide P is returnable by a retracting-spring $P^2$. The main or arc portion of the orifice $p$ is so shaped, it should be observed, that the type-wheel will be rotated far enough by the time the voting-key will have made half its movement in one direction and remain in that position during the other half of the movement of said voting-key.

To prevent more than one voting-key being turned by a given voter, I employ a reciprocatory slide Q, located beneath the disks N. This slide is provided with an elongated recess $q$ along one edge thereof and with a series of elongated orifices $q'$ to receive the shank of the corresponding voting-keys, also a spur $n^2$, Fig. 23, on the under side of the disks N, the shanks of the voting-keys having their bearings at their lower ends in orifices $d^9$ in the bottom of the case D' of the traveler, as shown in Figs. 12 and 23. The orifices $q'$ each have at one of the lateral edges thereof a recess $q^2$, extending transversely into the recess $q$. The slide Q is moved forward by the engagement of the spur $n^2$ in the recess $q^2$ as the voting-key is turned in the corresponding direction. In the recess $q$ I locate a series of sliding blocks Q', each of said blocks being of the same length as the centers of the recesses $q^2$ are apart one from the other. The entire length of the recesses $q$ is longer than that of the entire series of blocks only by the width of one of said recesses $q^2$, so as to admit the spur $n^2$ of any one of said disks N between said blocks, but no more. The adjacent ends of the blocks Q', at one of the edges thereof, are beveled, as shown, to readily permit any given spur $n^2$ moving into the corresponding recess $q^2$ between any two of the said blocks, thereby uncovering the corresponding recesses $q^2$ and at the same time covering all the rest of the recesses $q^2$ of the sereis, preventing the turning of any other of the disks N.

The slide Q is provided with an arm $Q^2$, (shown in Figs. 12 and 13,) beveled at the outer end thereof, said arm being forced under the rear end of the lever $D^7$ of the printing mechanism when the slide Q is advanced, thereby tilting said lever and causing the type-wheel to strike the paper-roll therebeneath. The slide Q is also connected, as by a bolt $q^5$, Fig. 23, with the collar 21, heretofore described, upon the axis 12, whereby the mover $D^8$ is operated in the manner heretofore set forth. The slide Q is also provided with spurs $q^3$ $q^4$, Fig. 11, acting upon the pawl 26 to push said pawl into and out of the orifices 27 and 28 upon the sleeve 16 at the proper intervals. The operation of each voting-key thus serves to transmit movement to the printing mechanism and to the mechanism for moving the traveler along the openings $A^3$ $A^4$ of the case A, the movement given to the printing mechanism being different for each key, while the movement given to the mover $D^8$ is the same for each key.

To prevent the operation of any of the voting-keys when the traveler has reached its downward limit, I provide a latch 29, as shown in Figs. 3, 4, and 7, pivotally connected to the brace $a^5$, having its free end resting normally up against the under surface of the adjacent chain C, said latch being provided with a spring 30 to hold it up thus in normal position. The bottom of the traveler is constructed with an orifice $d^{10}$, Figs. 10 to 13, through which when the traveler has reached its downward limit the said latch may project to engage a shoulder $q^8$, Fig. 12, of the arm $Q^2$ on the slide Q and prevent its being moved forward at all by any of the voting-keys. The slide Q is retracted by the spring $P^2$.

In Fig. 2 the right-hand voting-key is shown in position to disclose an opening 31 down to the paper-roll for writing thereupon a non-nominated vote. In Figs. 10 and 11 this opening is shown closed by an oscillatory shutter 32, located within the case of the traveler, operated by a connecting-arm 33, engaged with the disk N of the adjacent voting-key, the operation of said disk opening the shutter. Beneath the bottom of the traveler, mounted upon the journal 34 of the shutter, is a disk 35, Fig. 12, provided with a spur 36, projecting downward toward the paper, which, when the disk 35 is turned, as in Fig. 13, comes into contact with the tooth of the slide L, Fig. 3, heretofore described, operating said slide as already observed.

To free the traveler, in order that it may be returned to normal position after a voter has finished voting, I provide a lever R, Figs. 10, 11, and 13, fulcrumed at $r$, within the traveler, having a downwardly-projecting spur $r'$, Fig. 14, reaching down through a slot $r^2$ in the bottom of the case of the traveler almost to the paper therebeneath, and also having an upwardly-projecting spur $r^3$, lying in a slot 37 in the stop or pawl 18 of the mover $D^8$.

R' is a spring bearing upon the lever R. The spur $r'$ is engageable by the slide J, heretofore described. When the lever R is pushed toward its spring by the action of the slide J upon the spur $r'$, the stop 18 will be withdrawn from its engagement with the pinion 14, and as both pinions 13 and 14 are now free to move the traveler is free to return to its normal position, the return being effected by the spring-roller E.

On the stop 18 is a pin 38, which, when the stop is moved out of engagement with the pinion 14, will engage in a notch $p^9$ in the slide Q, thereby locking the slide and preventing movement of the voting-keys until the slide J is returned.

The voting-machine in operation may be located upon a suitable packing-case S, secured to the floor, the tube 9 passing up through the packing-case and screwed into the case A', as before observed. A curtain or screen T may be employed to seclude the voter. The operating chain or cable 8, however, might be passed upward through a table upon which the voting-machine may rest, if preferred.

Before the voter approaches the machine the wheel B is preferably worked back and forth sufficiently to bring the pins $h^6$ just past contact with the corresponding pawls H H', so that the first section of columns, before the spacing-pin $h^5$ operates, will be a complete section. The officer of the election having by means of the cable 8 adjusted the parts operated thereby in position the voter turns the crank I to the right or the left, as he may choose, and proceeds to manipulate the desired voting-keys until he has completed his vote, when by the officer in charge pulling the chain or cable the traveler will be released and returned to normal position.

The mechanism for recording a non-nominated vote might be dispensed with, if desired, making the machine simpler and cheaper.

A voting-machine arranged to record the vote upon a sheet of paper is obviously more economical than where an adding-register is provided.

Where an attachment is desired to record a non-nominated vote, the foregoing mechanism will be found simple and economical.

The voter being able to see his vote recorded on the paper will feel a confidence in the machine which he might not feel in a machine provided with an adding-register the parts of which are hidden from observation.

While it will take longer to obtain the results of an election by this system of registration, yet an important advantage will be secured thereby in that there will exist a printed record of votes, which may be kept, if required, for reëxamination.

The device hereinbefore termed a "traveler" might be termed a "carrier" for the voting-keys and the interior mechanism of the case D', and instead of making the carrier movable along the case A the carrier might be fixed and the case A be made movable.

If the voter wishes simply to vote a straight ticket, he selects the key corresponding to the party-ticket for which he desires to vote and continues moving said key back and forth till the carrier reaches the bottom of the list, each return of the key causing the carrier or traveler to descend to the next office-row. In case he desires to vote for any particular candidate not on the party-ticket chosen, he may simply turn the corresponding voting-key when the carrier reaches a given office-row, which will enable him to write a vote on the paper beneath the right-hand slot $A^3$ on the case A.

It will be obvious from the foregoing description that under no circumstances can he vote more than once in the same office-row. The operation of the right-hand key to register an independent vote will also register a suitable character on the party-column, so that there will be no blank spaces in said column, the type-wheel being provided with a suitable character for each registration.

When the polls are closed, the case A may be opened at the base thereof and the paper-rolls removed. Inasmuch as the columns are printed with the spaces above mentioned between various sections of office-rows the sheets can be readily cut along the open spaces between said sections to facilitate counting and to give a margin upon which to write the results.

The use of a traveler or carrier having only as many keys as there are party-columns would cheapen the cost of manufacture and be less confusing to the voter.

The sections between the spaces containing a uniform number of office-rows facilitate the counting of the votes.

It will be evident that when by means of the spring-roller E the traveler returns to normal position the catch $i^3$ will be forced back into normal position, carrying with it the bell-crank lever $I^2$ into normal position, so that said bell-crank lever is restored to primary position by each return of the traveler.

By the use of two rolls of paper, it being optional with the voter as to which he uses, it will be impossible to tell in what order any vote has been made.

Under the opening $A^3$ the slides J and L serve as chain-supports.

What I claim as my invention is—

1. In a voting-machine, the combination with a case provided with a longitudinally-extended opening, of means to receive the votes cast, and a traveler provided with a single set of voting-keys, one for each party-ticket operative through said opening, said traveler movable in a direction lengthwise of said opening, whereby all the candidates on a given ticket may be voted for by the manipulation of a single key, substantially as set forth.

2. In a voting-machine, the combination of a case provided with a longitudinally-extended opening, and with office-rows of the party-tickets, of means to receive the votes cast, and a traveler provided with a single set of voting-keys, one for each party-ticket operative through said opening, said traveler arranged to move transversely across said office-rows in a direction lengthwise of said opening, and to register the vote at each of said office-rows, whereby all the candidates on a given party-ticket may be voted for by the manipulation of a single key, substantially as set forth.

3. In a voting-machine, the combination with a fixed case provided with a longitudinally-extended opening, of means to receive a record of the votes cast, and a traveler provided with voting-keys one for each party-ticket operative through said opening, said traveler arranged to traverse said case step by step lengthwise of said opening and to record the votes cast, whereby all the candidates on a given party-ticket may be voted for by the manipulation of a single key, substantially as set forth.

4. In a voting-machine, the combination with a case provided with a longitudinally-extended opening thereinto, and with paper to receive a record of votes, of a traveler provided with voting-keys, one for each party-ticket operative through said opening, and means to record the votes cast upon the paper by the manipulation of said keys, whereby all the candidates on a given party-ticket may be voted for by the manipulation of a single key, said traveler movable across said case in a direction lengthwise of said opening, substantially as set forth.

5. In a voting-machine, the combination with a case provided with paper to receive the record of votes, of a carrier or traveler provided with voting-keys, one for each party-ticket, and means to imprint a party character or symbol upon the paper at each office row of the various party-tickets, whereby all the candidates on a given party-ticket may be voted for by the manipulation of a single key, said case constructed with a longitudinally-extended opening, and said carrier movable across said case lengthwise of said opening, substantially as set forth.

6. In a voting-machine, a case provided with two rolls of paper to receive the record of votes, and means to bring either of said rolls into position to receive the said record at the will of the voter, and a traveler provided with keys, one for each party-ticket whereby all the candidates on a given party-ticket may be voted for by the manipulation of a single key, substantially as set forth.

7. In a voting-machine, the combination with a case, of a movable carrier or traveler provided with a set of voting-keys, one for each party-ticket, and one for a non-nominated candidate, said case provided with longitudinally-extended openings, and with means to receive the votes cast by the manipulation of any of said keys, whereby all the candidates on a given party-ticket may be voted for by the manipulation of a single key, and means to move said carrier lengthwise of said openings, substantially as set forth.

8. In a voting-machine, a case provided with paper to receive the record of votes cast for a party-ticket, additional paper to receive the record of a non-nominated candidate, means to record the record of a non-nominated candidate thereupon, and a traveler or carrier provided with voting-keys, one for each party-ticket, whereby all the candidates on a given party-ticket may be voted for by the manipulation of a single key, said traveler movable across said case from the top toward the bottom, and vice versa, substantially as set forth.

9. In a voting-machine, a case provided with two rolls of paper to receive a record of votes cast, a carrier provided with voting-keys, one for each party-ticket, and with printing or stamping mechanism operated by any one of said keys, and means to bring either of said paper-rolls into position for receiving the record of said printing or stamping mechanism, whereby all the candidates on a given party-ticket may be voted for by the manipulation of a single key, substantially as set forth.

10. In a voting-machine, a case provided with two rolls of paper to receive the record of votes cast, a carrier provided with voting-keys, one for each party-ticket, mechanism to print or stamp the record of votes upon said rolls, and means to bring either of said rolls into position for the printing or stamping mechanism to operate thereupon, whereby all the candidates on a given party-ticket may be voted for by the manipulation of a single key, substantially as set forth.

11. In a voting-machine, the combination with a case provided with a face-plate, and with an elongated opening therein, of a movable cover for said opening, means to receive the record of votes cast, a carrier provided with voting-keys, one for each party-ticket and movable across the case lengthwise of said opening, from the top toward the bottom thereof, and vice versa, and means connected with said voting-keys, to record the votes, whereby all the candidates on a given party-ticket may be voted for by the manipulation of a single key, substantially as set forth.

12. In a voting-machine, a case provided with an elongated opening therein, means to receive the record of votes cast, the carrier or traveler provided with voting-keys, means connected with said voting-keys operating through said opening to record the votes, and a movable cover to cover said opening outside of said carrier, substantially as set forth.

13. In a voting-machine, a case provided with an elongated opening therein, means to receive the record of votes cast, the carrier or traveler provided with voting-keys, means connected with said voting-keys operating through said opening to record the votes, and a cover for said opening, said carrier or traveler and said cover being simultaneously movable, substantially as set forth.

14. In a voting-machine, a case provided with an elongated opening therein, a paper-roll within said case parallel with said opening, and a traveler traversing said case transversely of said opening, said traveler connected with means operating through said opening to record the votes upon the paper, substantially as set forth.

15. In a voting-machine, a case provided with an elongated opening therein, a paper-holding and a paper-receiving roll within said case, a bar underlying the paper passed from one of said rolls to the other, and a carrier or traveler provided with means operating through said opening to record the votes cast upon the paper, substantially as set forth.

16. In a voting-machine, a case provided with an elongated opening therein, two rolls of paper each engaged upon a paper-holding and a paper-receiving roll, and a bar underlying the paper passed from each paper-holding roll to the corresponding receiving-roll, a traveler provided with printing or stamping mechanism to record the votes upon the paper, said bars being movable to bring either bar under said printing or stamping mechanism, substantially as set forth.

17. In a voting-machine, a case A constructed with an elongated opening, an oscillatory case $G^6$ within the case A, two paper-holding and two paper-receiving rolls journaled in the case $G^6$, two bars $G^4$ $G^5$ engaged with the case $G^6$, and printing or stamping mechanism adjacent to said bars, the paper passing from each paper-holding roll over the corresponding bar to the corresponding receiving-roll, substantially as set forth.

18. In a voting-machine, a case provided with auxiliary paper-rolls F F', an elongated opening thereabove, a carrier traversing said opening provided with a voting-key, a cover for said opening movable by said voting-key to permit access to the paper therebeneath for recording thereupon a non-nominated vote, substantially as set forth.

19. In a voting-machine, the combination with a case provided with a longitudinally-extended opening, of means to receive the record of votes cast, a traveler provided with voting-keys, one for each party-ticket, and made movable across said case lengthwise of said opening, and mechanism to disengage the traveler at the extremity of its movement toward one end of said opening to permit a return thereof to normal position toward the opposite end of said opening, whereby all the candidates on a given party-ticket may be voted for by the manipulation of a single key, substantially as set forth.

20. In a voting-machine, the combination of a case provided with a longitudinally-extended opening, of means to receive a record of votes cast, a traveler provided with a single set of voting-keys, one for each party-ticket and arranged to traverse said case lengthwise of said opening, and means to return the traveler to normal position, substantially as set forth.

21. In a voting-machine, the combination of a case provided with a face-plate arranged to receive the party-tickets and provided with an elongated opening, and a movable traveler provided with voting-keys, one for each party-ticket, and arranged to traverse said face-plate, whereby all the candidates on a given party-ticket may be voted for by the manipulation of a single key, substantially as set forth.

22. In a voting-machine, the combination of a case provided with means to receive the record of votes cast, a face-plate arranged to receive the party-tickets and provided with an elongated opening therein, a traveler provided with a single set of keys, one for each party-ticket, and arranged to traverse the face-plate by successive steps, each step of the traveler being equal to the distance between the office-rows and the tickets, whereby all the candidates on a given party-ticket may be voted for by the manipulation of a single key, substantially as set forth.

23. In a voting-machine, the combination of a case provided with an elongated opening, a traveler to traverse said case in a direction lengthwise of said opening provided with a single set of voting-keys, one for each party-ticket, and a mover to cause the traveler to traverse the case lengthwise of said opening, whereby all the candidates on a given party-ticket may be voted for by the manipulation of a single key, substantially as set forth.

24. In a voting-machine, the combination of a case provided with a face-plate constructed with an elongated opening therein, and with a rack adjacent to one edge of said opening and a traveler provided with means to engage said rack to move the traveler along said opening in a direction lengthwise of said opening, said traveler provided with a single set of voting-keys, one for each party-ticket, whereby all the candidates on a given party-ticket may be voted for by the manipulation of a single key, substantially as set forth.

25. In a voting-machine, a case provided with a face-plate constructed with elongated openings $A^3$ $A^4$, and with a rack adjacent to each of said openings, and a traveler provided with means to engage both of said racks to move the traveler along said openings, substantially as set forth.

26. In a voting-machine, the combination of a case, a carrier movable from the top toward the bottom thereof and return, said carrier provided with voting-keys one for each party-ticket, and a mover to cause the carrier to traverse said case upon the manipulation of any given voting-key, whereby all the candidates on a given party-ticket may be voted for by the manipulation of a single key, substantially as set forth.

27. In a voting-machine, a case, a movable traveler provided with a set of voting-keys, one for each party-ticket, printing or stamping mechanism carried by said traveler, and a slide to operate said printing or stamping mechanism, said voting-keys causing a variable movement of said slide, said traveler movable across said case from the top toward the bottom thereof and return, substantially as set forth.

28. In a voting-machine, a traveler provided with a set of voting-keys and with printing or stamping mechanism, a slide to actuate said printing or stamping mechanism, a mover, a slide to actuate said mover, and disks engaged with each of said slides and with said voting-keys respectively to actuate said slides, substantially as set forth.

29. In a voting-machine, a carrier provided with a set of voting-keys and with printing or stamping mechanism actuated by said keys, and a mover consisting of an axis provided with pinions, tubular shafts 15, 16, upon said axis, said shafts provided with pawls to engage said pinions respectively, one of said shafts being rotatable upon said axis and both of said shafts being reciprocatory upon said axis, substantially as set forth.

30. In a voting-machine, a traveler provided with a series of voting-keys having in combination therewith a reciprocatory slide actuated by said keys, and a mover actuated by said slide, said mover consisting of an axis 12 provided with pinions at its extremities, reciprocatory tubular shafts upon said axis each provided with a pawl to engage the corresponding pinion, one of said shafts provided with a movable sleeve 21 to rotate the corresponding shaft and to reciprocate both of said shafts, and a pawl 26 to hold the first-mentioned pawl in engagement with said pinions, substantially as set forth.

31. In a voting-machine, the combination of a case provided with an elongated opening $A^3$, of a traveler movable along said opening and provided with a set of voting-keys, an opening 31 in the base of said traveler, and means actuated by one of said voting-keys to open and close the opening 31, substantially as and for the purpose set forth.

32. In a voting-machine, a traveler provided with a rotatable type-wheel, a ribbon covering the type-wheel, and an ink-reservoir provided with symbols or characters on the periphery thereof corresponding to those on the type-wheel but having similar characters arranged on opposite sides of the type-wheel and reservoir whereby the voter may see the symbol on the reservoir corresponding to that being printed by the type-wheel, substantially as set forth.

33. In a voting-machine, a case provided with a longitudinal opening, paper located therebeneath said opening to receive a record of the votes cast, a traveler provided with a single voting-key for each party-ticket, and a printing or stamping mechanism operated by said voting-keys to record the vote upon the paper, said traveler made movable along the case lengthwise of said opening, the record of the printing or stamping mechanism visible at successive steps through said opening, whereby all the candidates on a given party-ticket may be voted for by the manipulation of a single key, substantialy as set forth.

34. In a voting-machine, the combination with a case provided with an elongated opening $A^3$, of a traveler to traverse along said opening step by step, voting-keys connected with said traveler, a rack and pinion to move the traveler, a pawl 18 to engage said pinion, a lever R to lift said pawl out of engagement with the pinion, and means to return said pawl into engagement with the pinion, substantially as set forth.

35. In a voting-machine, the combination of a case provided with an elongated opening $A^3$, a movable slide J, and a rack adjacent to said opening, a traveler provided with voting-keys, and a pinion to mesh with said rack, a pawl to engage said pinion, and a lever R to disengage said pawl from the pinion, said lever R being movable by said slide, substantially as and for the purpose set forth.

36. In a voting-machine, a carrier provided with a set of voting-keys, a slide Q provided with locking-blocks Q', disks actuated by said voting-keys to actuate said slide, said slide provided with recesses $q^2$, and said disks provided with a spur to engage in said recesses respectively, said locking-blocks arranged to permit only the spur of one disk to engage in the corresponding recess at a time, substantially as and for the purpose set forth.

37. In a voting-machine, a traveler provided with a reciprocatory slide Q, a mover actuated by said slide, said mover consisting of an axis having tubular shafts 15, 16, mounted thereon, pinions mounted upon the ends of said axis, pawls to engage each of said pinions, a pawl 26 to lock the first-named pawls in engagement with their respective pinions, a collar 21 connected with said slide to actuate said shafts, and means connected with said slide to actuate the pawl 26, substantially as and for the purpose set forth.

38. In a voting-machine, a case provided with a rotatable wheel B, a gong, and mechanism actuated by the movement of said wheel B to strike the gong once as said wheel is moved in one direction, and to strike a succession of blows on the gong when the wheel moves in the opposite direction, substantially as set forth.

39. In a voting-machine, the combination of a case A, an oscillatory case $G^6$ provided with paper-rolls, a traveler provided with a set of voting-keys, and a crank I to oscillate the case $G^6$, substantially as set forth.

40. In a voting-machine, the combination of a case A provided with an oscillatory case $G^6$, a roller E provided with right and left hand screw-threads, a crank I provided with a pinion I', a bell-crank $I^2$ meshing with said pinion and engaged to oscillate the casing $G^6$, said bell-crank provided with a catch $i^3$ having its free end engaging with the threaded portion of said roller, substantially as and for the purpose set forth.

41. In a voting-machine, the combination of a case, a rotatable wheel B, an operating chain or cable connected therewith, a disk $B^3$ adjacent to said wheel, two sets of paper-rolls having one shaft in each set of said rolls provided with ratchet-wheels, pawls connected with the disk $B^3$ to operate said ratchet-wheels, and means to give a further movement to the ratchet-wheels once at each complete revolution, thereof, the disk $B^3$ actuated by the rotation of the wheel B, substantially as set forth.

42. In a voting-machine, the combination of a case, a slide J engaged therewith, a bar K engageable with said slide, a rotatable wheel B provided with an operating chain or cable connected with said bar, and a movable traveler engageable with the slide J, substantially as and in the manner set forth.

43. In a voting-machine, the combination of a case provided with an elongated opening $A^3$, a toothed slide L adjacent thereto, paper-rolls F F' one of which is provided with a ratchet-wheel $F^2$, an operating-wheel B, a pawl engageable with said ratchet-wheel actuated by the movement of said wheel B, and a traveler engageable with said toothed slide, said slide arranged to force said pawl into engagement with said ratchet-wheel, substantially as set forth.

44. In a voting-machine, the combination of a case A, a slide J, a bar K engageable by said slide, a rotatable wheel B to actuate said slide, a roller E provided with right and left hand screw-threads, a crank I having its shaft provided with a pinion I', a bell-crank lever $I^2$ meshing with said pinion, and mechanism connecting the bar K with said bell-crank lever whereby said rod may be returned to normal position by the movement of the bell-crank lever in either direction, substantially as set forth.

45. In a voting-machine, the combination of a case provided with a paper-roll, a traveler provided with printing or stamping mechanism to record the votes upon said paper-roll, and means whereby said record may be made in columns divided into sections of desired length, the record being spaced between said sections, substantially as set forth.

46. In a voting-machine, the combination of a case A, a roller E, a bell-crank lever $I^2$, a crank I, a movable traveler, and means to return the traveler into normal position, said bell-crank lever returnable to normal position with the traveler, substantially as set forth.

47. In a voting-machine, the combination of a case provided with elongated openings $A^3$ $A^4$, a traveler to traverse said openings provided with voting-keys, chains engaged with said traveler to close said openings, the roller E engageable with one or both of said chains, substantially as set forth.

48. In a voting-machine, a movable traveler provided with a series of voting-keys, a reciprocatory slide O actuated by said keys, a case A provided with a reciprocatory slide J, means to reciprocate said latter slide, and means to lock the slide O to prevent the movement of the voting-keys when the traveler has moved to its limit of movement until the slide J is returned, substantially as set forth.

49. In a voting-machine, the combination of a case provided with means to receive a record of the votes cast, a traveler movable along said case provided with a series of voting-keys, and means to lock the voting-keys when the traveler has reached its limit of movement until the traveler has been restored to normal position, substantially as set forth.

In testimony whereof I sign this specification in the presence of two witnesses.

FRANK H. GILBERT.

Witnesses:
   SAMUEL P. MACKEY,
   JAMES M. ELEY.